May 2, 1967  J. B. HOLT  3,317,206
ILLUSORY THREE-DIMENSIONAL PROJECTION SYSTEM
Filed April 29, 1963  3 Sheets-Sheet 1
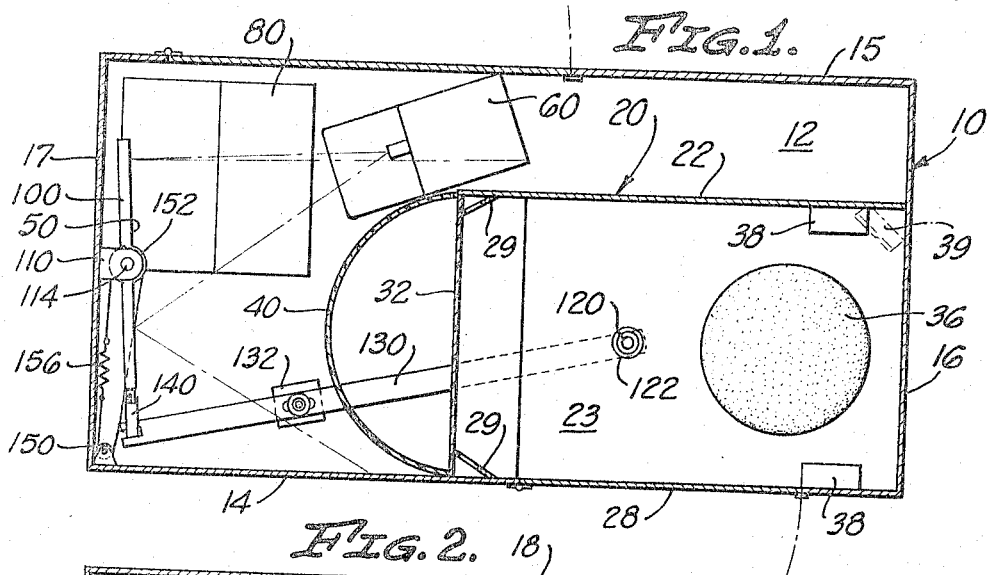
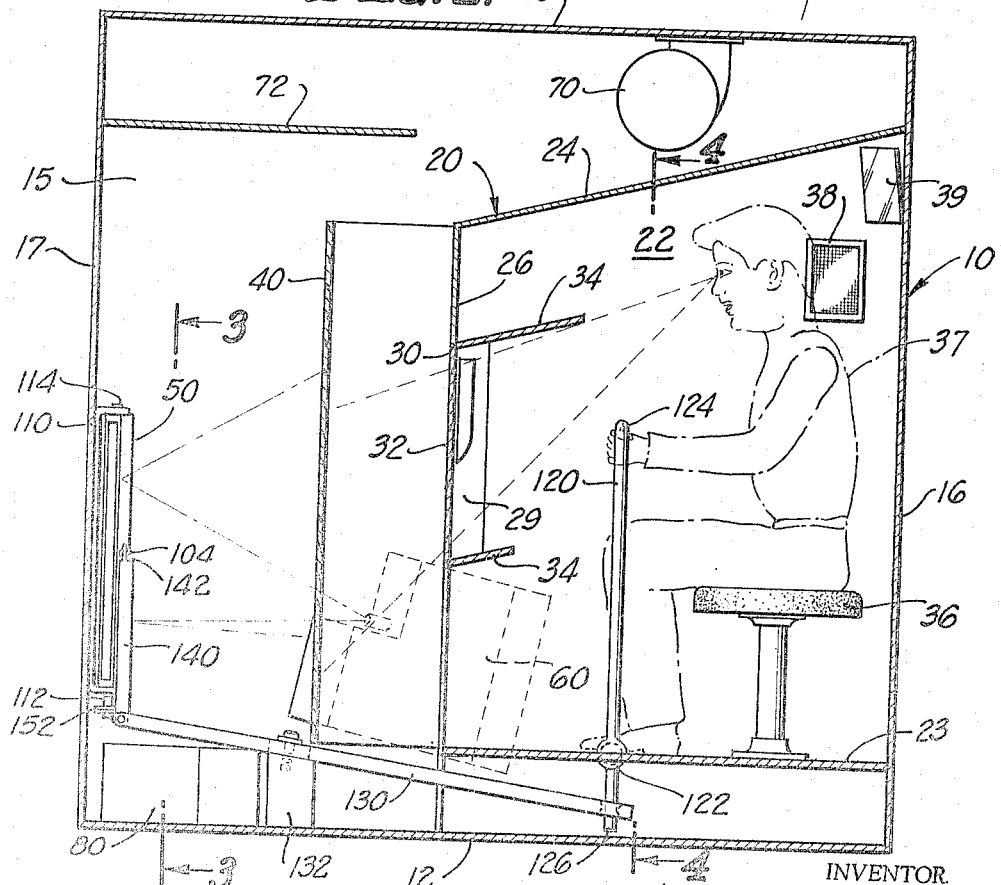
INVENTOR.
JAMES B. HOLT
BY
MAHONEY, HALBERT &
HORNBAKER
ATTORNEYS

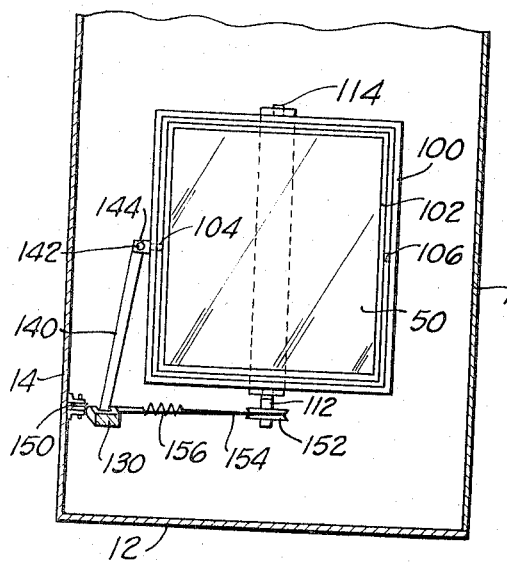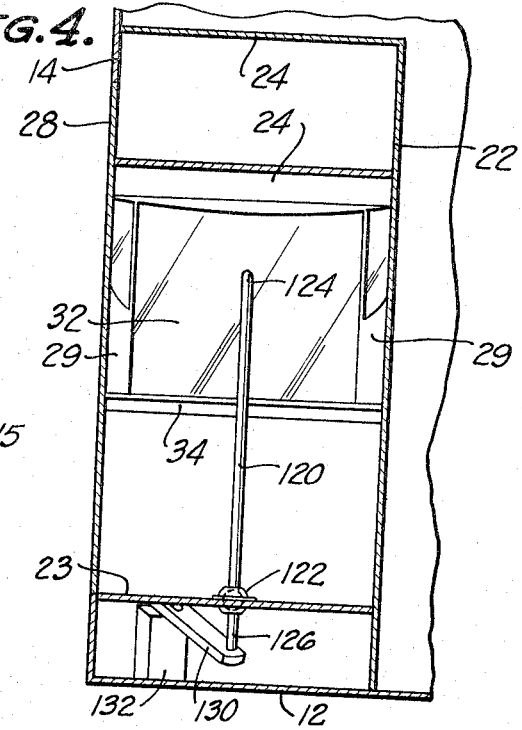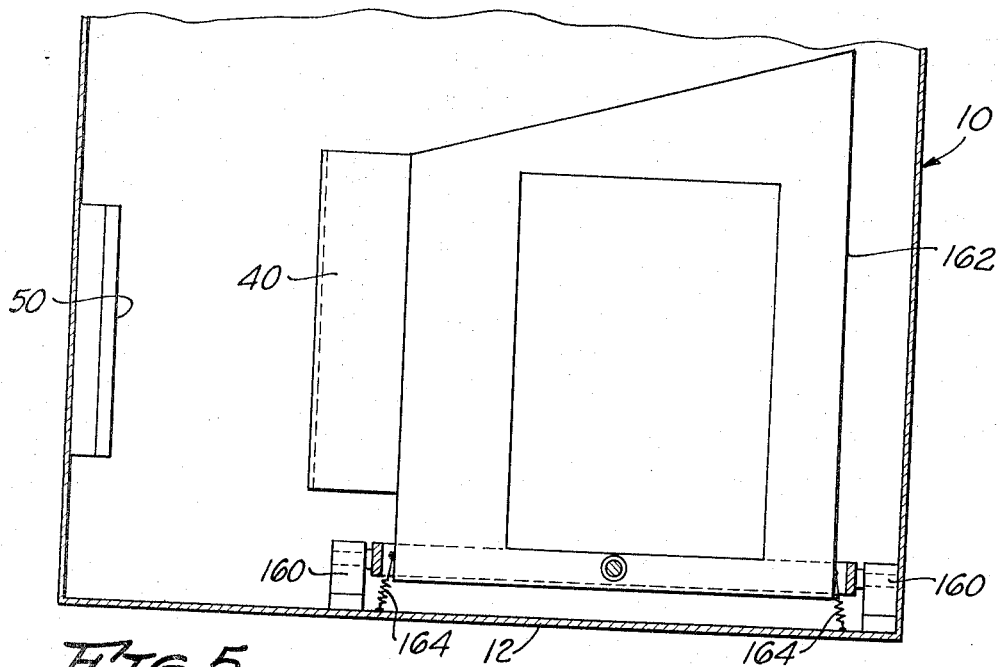

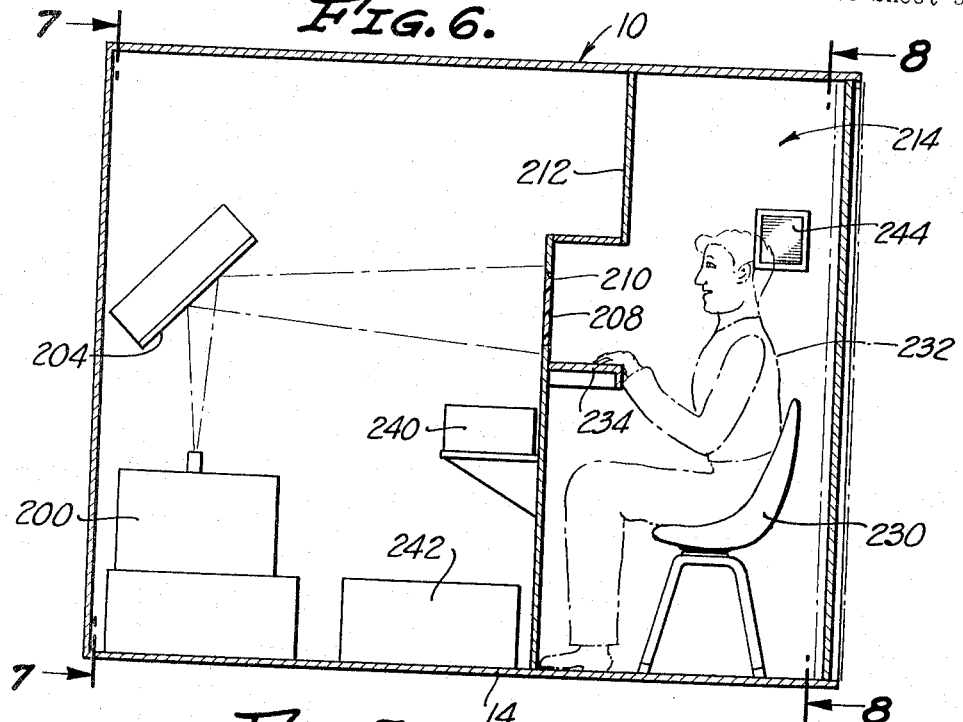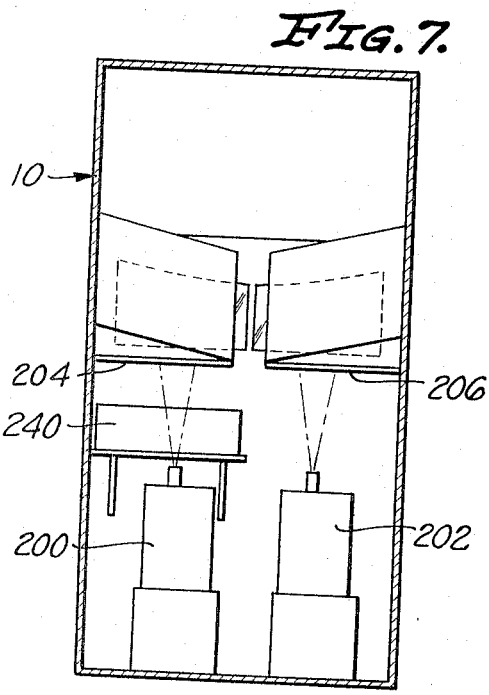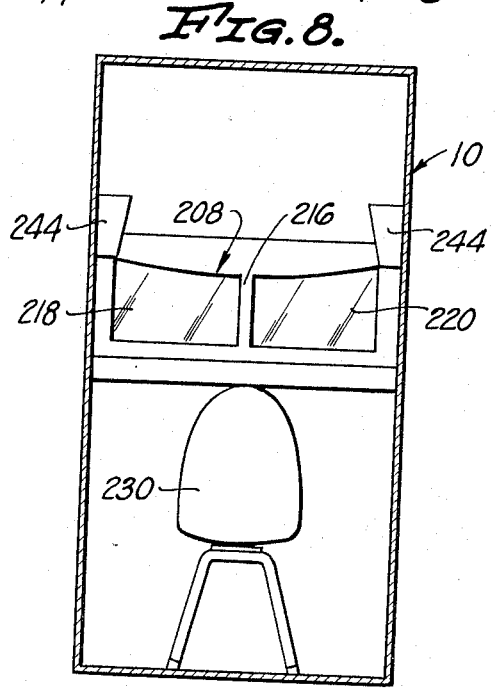

United States Patent Office 3,317,206
Patented May 2, 1967

3,317,206
ILLUSORY THREE-DIMENSIONAL PROJECTION SYSTEM
James B. Holt, 6927 Varna Ave., Van Nuys, Calif. 91405
Filed Apr. 29, 1963, Ser. No. 276,533
6 Claims. (Cl. 272—8)

This invention relates to an image projecting device and system which gives an illusory three-dimensional effect to a projected picture.

The invention is applicable to the projection of motion pictures, still pictures, slide films, or any type of projected image. Furthermore, although the invention is herein shown and described as used in association with a booth, which may be freely accessible or coin-operated, it will be readily understood that the device of the present invention need not be enclosed in a booth or other confined space, and that the depiction and description of the booth are for illustrative purposes only, and are not intended as a limitation.

Ever since the days of the magic lantern, attempts have been made to increase the illusory effect of images to be viewed by adding a third-dimensional characteristic thereto. One early device offered and widely used at the turn of the century was the stereoscope which combined the images of two pictures taken from points of view a little apart from each other. Particularly in the motion picture field, the art has advanced far beyond the stereoscope, but the devices currently in use in the said field to create illusory three-dimensional effects are extremely complex and elaborate.

It is, therefore, an object of the present invention to provide an uncomplicated device which will effectively give a three-dimensional illusion of solidity and depth to a projected image without the necessity of providing complex, expensive and sensitive elements.

It is yet another object of the invention to provide such a device in one embodiment thereof which utilizes one projector instead of a plurality of projectors, and which attains its illusory effect by the projection of a single image, rather than a plurality of superimposed images, the limitations of superimposition being obvious to those skilled in the art.

It is still a further object of the invention to provide such a device which is easily adjustable so that the operator, even if unskilled, may add to, detract from, and continuously change the illusory effect of the projected image at will.

The foregoing, as well as other objects and advantages of the invention, will become apparent from a consideration of the description which follows, taken in conjunction with the drawings, in which:

FIG. 1 is a horizontal sectional view of a first embodiment of the present invention;

FIG. 2 is a vertical sectional view of the embodiment shown in FIG. 1;

FIG. 3 is a view taken on line 3—3 of FIG. 2;

FIG. 4 is a view taken on line 4—4 of FIG. 2;

FIG. 5 is a sectional view, partly diagrammatic, showing, as an alternative, means of movably mounting the operator's booth;

FIG. 6 is a sectional view of an alternative form of the present invention;

FIG. 7 is a view taken on line 7—7 of FIG. 6; and

FIG. 8 is a view taken on line 8—8 of FIG. 6.

As best illustrated in FIGS. 1 and 2, an enclosure 10 has a floor 12, a side wall 14, an opposite side wall 15, an end wall 16, an opposite end wall 17, and a roof 18.

A booth 20 is disposed within the enclosure 10, said booth 20 being defined by the end wall 16, the side wall 14, an opposite side wall 22, a floor 23, preferably spaced above the floor 12, a roof 24, and a front wall 26. A hinged door 28 is provided in the side wall 14 to provide ready access to the interior of the booth 20. Bolsters 29 may be mounted between the side wall 14 and the front wall 26, and between the side wall 22 and the front wall 26.

In the first embodiment of the invention, the front wall 26 of the booth 20 has an opening 30 therein at eye-level, and mounted in said opening 30 is a transparent panel 32, preferably of glass or Plexiglas. Shields 34 may be mounted on the front wall 26 at the top and bottom of the opening 30 and disposed at appropriate angles to prevent glare on the panel 32. If desired, panel 32 may be partially masked, top and bottom, by arcuate masks so as to reduce distortions in the reflected image.

A seat 36 is mounted on the floor 23, adjacent the end wall 16, and in proper position to permit clear viewing of the panel 32 by an operator 37. If simultaneous sound effects are desired, one or more sound speakers 38 may be disposed in the booth 20. To add to the illusory effect, a mirror 39, or a plurality of mirrors 39, may be mounted in the booth 20 and directed toward the panel 32 to pick up projected images on the panel 32.

Externally of the booth 20, an arcuate translucent viewing screen 40 is mounted on the front wall 32, in position to pass an image through the screen 40 to the rear surface thereof to be viewed through the panel 32.

It will be readily understood that in lieu of mounting panel 32 in the opening 30 of the front wall 26 of the booth 20, panel 32 may be mounted on screen 40 transversely to the ends of screen 40.

Pivotally mounted on the end wall 17, and spaced apart from but in alignment with the screen 40, is a mirror 50, the attitudes of which may be controlled and regulated by the operator 37 in the manner hereinafter described.

A projector 60 is mounted in the enclosure 10, preferably externally of the booth 20, in position to be focused on the mirror 50 for projection of an image thereon.

If desired, a ventilator blower 70 may be disposed in the enclosure 10, as by mounting on the roof 18, and a storage shelf 72 may be mounted at any convenient place, as on the end wall 17.

Again, if simultaneous sound effects are desired, sound equipment 80, suitably connected to the speakers 38, and, if desired, synchronized with the projector 60, is provided.

The illusory effect of the projected image may be heightened by changing the positions of the mirror 50 at the will of the operator 37 so as to change the attitudes of the projected image on the screen 40 and the panel 32, and for that purpose, as best illustrated in FIGS. 1–3 of the drawings, the mirror 50 is mounted so that the directions of its reflections may be selectively varied, thus changing the attitudes of the reflected image as it passes through the screen 40 to the panel 32.

For those purposes, an outer frame 100 and an inner frame 102, spaced inwardly from the frame 100, are provided, the inner frame 102 being attached to and surrounding the mirror 50. The frames 100 and 102 are supported and maintained in their positions relative to each other by transverse studs or pins 104 and 106, said pins 104 and 106 being securely mounted on the inner frame 102 at substantially the center of the sides thereof, said pins 104 and 106 being loosely disposed in aligned bores in the outer frame 100, with the pin 104 projecting outwardly from the outer frame 100, so that, when rotation movement is imparted to the protruding end of the pin 104 in the manner hereinafter described, the inner frame 102 and the mirror 50 mounted therein will turn within the plane of the outer frame 100 to change the horizontal direction of the image reflected by the mirror 50.

A U-shaped bracket 110 is mounted on the end wall 17, and the outer frame 100 is pivotally mounted, top and bottom, on the open ends of the bracket 110 at substantially the center of the top and bottom of the outer frame 100 by suds or pins 112 and 114 which are securely mounted on the outer frame 100, with the pin 112 projecting outwardly from the open end of the bracket 110 so that, when rotation movement is imparted to the projecting end of the pin 112 in the manner hereinafter described, both the outer frame 100 and the inner frame 102 (supported on the outer frame 100 by the pins 104 and 106) and the mirror 50 mounted in the inner frame 102 will turn to change the vertical direction of the image reflected by the mirror 50.

A control lever 120, illustrated in FIG. 2 and in FIG. 4 of the drawings, is mounted by a universal joint fulcrum 122 at the floor 23 of the booth 20, with its upper end 124 disposed in position readily accessible to the operator 37. The lower end 126 of the control lever 120 extends below the floor 23. A lever arm 130 is mounted adjacent one end thereof on the control lever 120 adjacent the lower end 126 of the control lever 120, and the other end of the lever arm 130 is disposed below the mirror 50. The lever arm 130 is pivotally and slidably mounted intermediate its ends to a support structure, such as a block 132, mounted on the floor 12 of the enclosure 10, which serves as a fulcrum for the lever arm 130.

The end of the lever arm 130 which is disposed below the mirror 50 has pivotally mounted thereon a rod 140, said rod 140 being mounted on the lever arm 130 adjacent the lower end of the rod 140. At the upper end of the rod 140 is a clevis 142. The protruding end of the pin 104 is disposed in the clevis 142 and secured in the clevis 142 by a pin 144.

Thus, by backward and forward movement of the control lever 120, the lever arm 130 will slide in its mounting on the block 132 and will move the rod 140 and the clevis 142 mounted thereon so as to rotate the pin 104 and turn the inner frame 102 and the mirror 50 to change the vertical direction of the image reflected by the mirror 50.

A first pulley 150 is mounted on the side wall 14, and a second pulley 152 is mounted on the protruding end of the pin 112 in alignment with the pulley 150. An endless belt 154 is disposed between the pulley 150 and the pulley 152, and the belt 154 is suitably attached to the end of the lever arm 130. A spring 156 may be mounted on the belt 154 so as to provide tension in the belt 154.

It will thus be seen that when the operator 37 moves the control lever 120 laterally, the lever arm 130 will move the belt 154 so as to rotate the pin 112, thereby rotating the outer frame 100, the inner frame 102, and the mirror 50 to change the horizontal direction of the image reflected by the mirror 50.

It will be understood that, in lieu of changing the positions of the mirror 50 in the manner hereinabove described so as to change the attitudes of the projected image, the mirror 50 may be held in fixed position, while the projector 60 is selectively moved horizontally and vertically to change the attitudes of the image as it is projected onto the mirror 50.

If it is desired to add further to the illusory effect, the booth 20 may be pivotally supported in the enclosure 10 so that, when weight is shifted to either side of the booth 20, a rocking motion may be imparted to the booth 20. As best illustrated in FIG. 5 of the drawings, this may best be accomplished by pivotally supporting the floor 23 of the booth 20 on gimbals 160 mounted on the floor 12 of the enclosure 10. In said form of the booth, separate walls, such as end wall 162, are provided for the booth 20, so that the booth 20 forms a fully independent unit within the enclosure 10. For better balance and control, springs 164 may be mounted on the floor 12 of the enclosure 10 on the floor 23 of the booth 20.

In the alternative form of the present invention illustrated in FIGS. 6–8 of the drawings, dual projectors 200 and 202 are disposed on the floor 14 of the enclosure 10. Said projector 200 projects an image vertically to a mirror 204 which is suitably mounted in the enclosure 10 at an oblique angle. The projector 202 similarly and simultaneously projects an image vertically to mirror 206 which is also suitably mounted in the enclosure 10 at an oblique angle. Both of the mirrors 204 and 206 are disposed so as to reflect the projected image to a translucent screen 208 which is disposed in an opening 210 in a front wall 212 of a booth 214, in turn disposed in the enclosure 10 in substantially the same position as the booth 20 in the first embodiment of the invention.

The screen 208 is divided at approximately its vertical center by an opaque strip 216 so as to separate the screen 208 into a left-hand portion 218 and a right-hand portion 220. It is preferred that the upper edge of the screen 208 be arcuate, as best illustrated in FIGS. 7 and 8.

A seat 230 for an operator 232 is disposed in the booth 214 so as to permit the operator 232 a clear view of both the left-hand portion 218 and the right-hand portion 220 of the screen 208. Additionally, a desk or shelf 234 may be mounted on the front wall 212 within the booth 214 to serve as a convenient resting place for the hands of the operator 232.

The mirror 204 is disposed so as to reflect the projected image from the projector 200 onto the right-hand portion 220 of the screen 208, while the mirror 206 is disposed so as to reflect the projected image from the projector 202 onto the left-hand portion 218 of the screen 208.

If simultaneous sound effects are desired, a sound unit 240 may be disposed in the enclosure 10, as by mounting on the front wall 212, as illustrated in FIG. 6 of the drawings; a sound amplifier unit 242 suitably connected to the sound unit 240, may also be disposed in the enclosure 10, as by placing it on the floor 14 of the enclosure 10, as illustrated in said FIG. 6, and one or more speakers 244, also connected to the sound amplifier 242, may be disposed in the booth 214.

In the operation of the first embodiment of the present invention, the projector 60 casts an image on the mirror 50 which, in turn, reflects the image through the translucent screen 40 to the rear surface thereof, where it is viewed through the transparent panel 32 by the operator 37 in illusory three-dimensional effect created by the arcuate screen 40. As indicated above, the operator 37 may adjust the illusory effect of the image on the panel 32 by changing the attitudes of the mirror 50 in the manner hereinabove described, or by changing the positions of the projector 60. The operator 37 may also add to the illusory effect, when the movable booth illustrated in FIG. 6 is utilized, by shifting his weight laterally within the booth.

In the operation of the alternative form of the present invention, illustrated in FIGS. 6–8 of the drawings, the three-dimensional illusory effect is created by the simultaneous projection in the manner hereinabove described of matching images on the divided screen 208 and the simultaneous viewing thereof by the operator 232.

While the instant invention has been shown and described herein in what is conceived to be the most practical and preferred embodiments thereof, it is recognized that departures may be made therefrom within the scope of the invention, which is therefore not to be limited to the details disclosed herein, but is to be accorded the full scope of the appended claims.

I claim:

1. An illusory three-dimensional image projection system which comprises: an image projector; a universally mounted mirror disposed so as to receive an image from said projector and reflect the image; an arcuate translucent screen disposed so as to receive said image reflected by the mirror and pass the image through the screen; a transparent panel disposed to expose the image projected to the screen and expose said image for viewing; and means for selectively changing the attitudes of the image, said means comprising means for selectively varying the positions of said mirror.

2. An illusory three-dimensional image projection system as defined in claim 1, including: an inner frame mounted on said mirror; an outer frame surrounding said inner frame and spaced therefrom; and wherein said inner frame is disposed so as to rotate vertically relative to said outer frame, said outer frame and said inner frame are disposed so as to rotate horizontally as a unit.

3. An illusory three-dimensional image projection system as defined in claim 1, wherein said universal mounting of the mirror is along its vertical and horizontal axes, and wherein said means for selectively varying the positions of said mirror comprises: a control lever having a universal joint fulcrum; a lever arm mounted adjacent one end of said control lever; a first protruding pin mounted on the side of said mirror; a rod interconnecting said lever arm and said first pin and disposed so as to vary the position of the mirror and change the vertical direction of the image reflected by the mirror upon manipulation of the control lever; a second protruding pin mounted in the vertical axis of the mirror; a first pulley mounted adjacent the mirror; a second pulley mounted on said second pin; and an endless belt disposed on said pulleys, said belt being connected to said lever arm intermediate said pulleys, so as to vary the position of the mirror and change the horizontal direction of the image reflected by the mirror upon manipulation of the control lever.

4. An illusory three-dimensional image projection system which comprises: a booth structure having a front wall; a transparent panel mounted in said front wall; an image projector disposed externally of said booth; a mirror disposed externally of said booth so as to receive an image from said projector and reflect the image; an arcuate translucent viewing screen disposed externally of said booth so as to receive the image reflected by the mirror and expose said image for viewing through the panel; and control means in the booth and connected to the mirror for varying the positions of the mirror so as to vary the directions of reflection of the image.

5. An illusory three-dimensional image projection system as defined in claim 4, wherein the control means comprises: a control lever having a universal joint fulcrum; a lever arm mounted adjacent one end of said control lever; a first protruding pin mounted on the side of said mirror; a rod interconnecting said lever arm and said first pin and disposed so as to vary the position of the mirror and change the vertical direction of the image reflected by the mirror upon manipulation of the control lever; a second protruding pin mounted in the vertical axis of the mirror; a first pulley mounted adjacent the mirror; a second pulley mounted on said second pin; and an endless belt disposed on said pulleys, said belt being connected to said lever arm intermediate said pulleys, so as to vary the position of the mirror and change the horizontal direction of the image reflected by the mirror upon manipulation of the control lever.

6. An illusory three-dimensional image projection system as defined in claim 5, wherein the booth is pivotally mounted for selective lateral rotational movement.

References Cited by the Examiner

UNITED STATES PATENTS

| 1,514,543 | 11/1924 | Lane et al. | 88—16.6 |
| 2,352,101 | 6/1944 | Hutter | 88—24 |
| 2,861,806 | 11/1958 | Disney | 272—18 |
| 3,003,257 | 10/1961 | Madden | 35—43 |

RICHARD C. PINKHAM, *Primary Examiner.*

F. B. LEONARD, A. W. KRAMER, *Assistant Examiners.*